United States Patent Office 3,506,418
Patented Apr. 14, 1970

3,506,418
HYDROCARBON STEAM REFORMING
William G. Billings, Bartlesville, Okla., assignor to Phillips Petroleum Company, a corporation of Delaware
No Drawing. Filed Jan. 2, 1968, Ser. No. 694,845
Int. Cl. C01b 2/16; C10k 3/00; B01j 11/32
U.S. Cl. 48—214          7 Claims

ABSTRACT OF THE DISCLOSURE

Hydrocarbons are steam reformed to synthesis gas or to a gaseous product rich in methane fungible with natural gas by contacting with a transition metal steam reforming catalyst such as cobalt molybdate treated with a barium salt of an organic acid.

BACKGROUND OF THE INVENTION

This invention relates to the production of synthesis gas or gases rich in methane fungible with natural gas from non-methane containing feedstocks and feedstocks lean in methane. In accordance with one aspect, this invention relates to the conversion of hydrocarbons to synthesis gas or to a gaseous product rich in methane by contacting with a barium treated transition metal steam reforming catalyst. In accordance with a further aspect, this invention relates to the conversion of light hydrocarbon, such as propane, to synthesis gas or to a gaseous product rich in methane fungible with natural gas by contacting with a cobalt molybdate catalyst treated with a barium salt of an organic acid in the presence of steam.

Utility companies which distribute gas for household or other use have an increasing acute need for an economical means of supplying gas during peak-load periods. During cold weather, for example, demand may be double or triple the volume used on a mild day. In many instances, the peak-load demand is met by adding propane-air mixtures to the gas. Because the quantity of propane-air that can be blended is limited, there is a need for an economic process that can be used to supply peak-load demand.

Mixtures of carbon monoxide and hydrogen, or synthesis gas, are useful in the synthesis of hydrocarbons and alcohols. Synthesis gas is also useful a a source of hydrogen for various chemical reactions, particularly hydrogenation and ammonia synthesis. Carbon monoxide contained in synthesis gas mixtures is the full equivalent of hydrogen because it can be made to yield an equivalent quantity of hydrogen by reaction with steam in the water-gas shift reaction. Consequently, by far the larger proportion of ammonia produced at the present time depends on synthesis gas as a source of hydrogen for the ammonia synthesis reaction.

Accordingly, the present invention relates to an improved process and catalyst for the production of either synthesis gas or methane-containing gases fungible with natural gas from hydrocarbon feedstocks, particularly light hydrocarbon feedstocks containing propane.

An object of this invention is to provide a new and improved catalyst useful for the conversion of hydrocarbons to synthesis gas or to a methane-rich gas.

Another object of this invention is to provide a new and improved catalyst having increased catalyst life, useful for the steam reforming of hydrocarbons to produce synthesis gas or methane-rich gaseous products.

Another object of this invention is to provide an improved process for the conversion of hydrocarbons to synthesis gas or methane-rich gaseous products fungible with natural gas.

A further object of this invention is to provide an improved process and catalyst whereby light hydrocarbons, such as propane, are converted to synthesis gas or gaseous products rich in methane and fungible with natural gas.

Other aspects, objects, as well as the several advantages of this invention, will be apparent to one skilled in the art from a study of this disclosure and the appended claims.

SUMMARY OF THE INVENTION

According to the invention, a process is provided for the production of synthesis gas or methane-containing gases fungible with natural gas from hydrocarbon feedstocks which comprises contacting said feedstock and steam with a chromate, tungstate or molybdate of iron group metal catalyst treated with a barium salt of an organic acid such as barium acetate.

Further, in accordance with the invention, an improved catalyst useful for the conversion of hydrocarbons to synthesis gas or methane-rich gaseous products is provided which comprises a supported chromate, tungstate or molybdate of iron group metals, including iron, cobalt and nickel, promoted with a barium salt of an organic acid such as barium acetate. Preferably, the support for the catalyst comprises an alumina-containing support material such as alumina.

PREFERRED EMBODIMENTS

The hydrocarbon feedstocks processable to synthesis gas or methane-rich products according to the invention comprise hydrocarbons having from 2 to about 15 carbon atoms per molecule. Such feedstocks preferably contain predominantly paraffinic hydrocarbon such as propane, butane, hexane, octane, decane, dodecane, pentadecane, and the like. The hydrocarbon feedstock can contain minor amounts of unsaturated materials when desired. The higher molecular weight hydrocarbons in the feedstock will ordinarily have a maximum boiling point of about 500° F.

The reforming temperature employed can vary appreciably and is in the range of 600°–1600° F., preferably in the range 600°–1000° F., for best results in obtaining gaseous products rich in methane and in the range 1000°–1600° F. for synthesis gas production. The reaction pressure will ordinarily be 0–1500 p.s.i.g., but higher pressures can be used to advantage to give a product gas containing more methane and carbon dioxide and less synthesis gas, i.e., hydrogen and carbon monoxide. The steam to hydrocarbon weight ratio is ordinarily at least 1.2 to 1, generally in the range from 1.2:1 to 6:1. The total gaseous hourly space velocity (GHSV) ordinarily ranges from 500–40,000 volumes of gas per volume of catalyst per hour, calculated at 32° F. and 1 atmosphere.

The chromate, tungstate or molybdate catalysts of iron group metals, including iron, cobalt and nickel, can be either nonreduced or reduced and stabilized to prevent reaction with the oxygen in the air prior to impregnation with the barium salt. The catalyst used in the process of the invention is preferably a supported cobalt molybdate catalyst treated with barium acetate. The catalysts of the invention ordinarily contain from 1–10 weight percent of the iron group metal and from 5–25 weight percent of the chromate, tungstate or molybdate, calculated as oxide, i.e., $CrO_3$, $WO_3$ or $MoO_3$. The remainder of the catalyst is comprised of support material, such as alumina or an alumina-containing material.

Instead of alumina, other natural or synthetic refractory base material supports, such as silica, alumina, zirconia, thoria, beryllia, boria, magnesia, titania, binary combinations thereof such as silica-alumina, silica-magnesia, boria-alumina, magnesia-alumina, beryllia-titania, and the like, and ternary combinations thereof, such as silica-alumina-thoria, silica-magnesia-zirconia, alumina-beryllia-titania, and the like; naturally occurring supports such as kieselguhr, diatomaceous earth, fuller's earth, perlite, and the like; Group II aluminate spinels and mixtures thereof, including mixtures of spinels and excess Group II metal oxide or spinels and excess alumina, such as calcium aluminate (e.g., $CaO \cdot Al_2O_3$), zinc aluminate, magnesium aluminate, barium aluminate, beryllium aluminate, strontium aluminate, and the like; natural or synthetic crystalline alumino-silicates such as levynite, erionite, faujasite, analcite, noselite, heulandite, stilbite, phillipsite, brewsterite, datolite, chabazite, leucite, scapolite, mordenite, sodalite, calcium aluminosilicate (e.g., $CaO \cdot Al_2O_3 \cdot 2SiO_2$), barium aluminosilicate, aluminum silicate (e.g., $Al_2O_3 \cdot SiO_2$ or $3Al_2O_3 \cdot 2SiO_2$) and the like, can be used. The catalyst of the invention exhibits a considerably longer catalyst life than is obtained with other prior art promoted catalysts.

Steam reforming of hydrocarbons, according to the invention, results in the formation of synthesis gas or a gaseous product fungible with natural gas, which product contains as much as 70–90 percent methane, calculated on a $CO_2$- and $C_3H_8$-free basis.

The catalysts can be prepared by any of the procedures known to the industry, such as by impregnation of the support with aqueous or nonaqueous solutions of the active ingredients, coprecipitation of the active and support ingredients, physical mixing, and the like. The barium promoter can be added before, during, or after the addition of the catalyst components to the support and can be added in the form of any salt of an organic acid or hydroxy-substituted organic acid that is soluble in water or an organic solvent. Examples of barium salts that can be used are the formate, acetate, propionate, butyrate, caproate, maleate, gluconate, benzoate, salicylate, mandelate, cinnamate, and the like. A presently preferred method for preparing the catalysts of the invention is to impregnate the support material with an aqueous chromium, tungsten, or molybdenum salt solution, dry and calcine the impregnated support to decompose or oxidize the salt to form the oxide, impregnate the resulting material with an aqueous iron, cobalt, or nickel salt solution, dry and calcine the impregnated material to decompose or oxidize the salt to form the oxide and/or the chromate, tungstate, or molybdate, impregnate the resulting material with an aqueous or nonaqueous solution of the barium salt of an organic acid, and dry and calcine the impregnated material to decompose or oxidize the barium salt to form the oxide. The ratio of the Group VI–B (i.e., Cr, Mo, W) oxide to iron group oxide in the finished catalyst can be that corresponding to the so-called chromate, molybdate, or tungstate, or can be different, and the impregnation can be in either order. The chromate, molybdate, or tungstate can exist either as such (e.g., $NiCrO_4$, $FeWO_4$) or as the mixed oxides (e.g., $CoO \cdot MoO_3$, $NiO \cdot WO_3$).

For use in fixed-bed operation, the catalyst can be granulated or pelleted at any suitable point during the preparation of the catalyst. For use in fluidized-bed operation, such granulation or pelleting is unnecessary.

The use of alkali or alkaline earth promoters in steam reforming catalysts is known. However, according to the invention, we have shown that the use of a particular alkaline earth in the form of a soluble salt of an organic acid results in the production of a catalyst that is more active than a similar catalyst using the promoter most used in catalysts of commerce, i.e., potassium carbonate.

Although the catalysts of the invention are sulfur insensitive, and can be used in sulfided form with sulfur-containing feeds, it is within the scope of the invention to treat the hydrocarbon feedstock prior to contacting in the reforming zone to remove sulfur containing materials from the feedstock. In an optional procedure, the hydrocarbon feedstock is first passed through a guard chamber bed containing a molecular sieve and then through a second guard chamber bed containing zinc oxide. It is within the scope of the invention to use either or both of the beds, depending upon the contaminants present in the feedstock being treated, and to use the beds either in the same or separate guard chambers. In the event that the hydrocarbon feedstock contains carbonyl sulfide (COS), both guard chambers are employed. It has been found that the zinc oxide is effective for removing carbonyl sulfide as well as other residual sulfur compounds at elevated temperatures and pressure. At ambient conditions, the zinc oxide removes only $H_2S$.

In actual operation, the molecular sieve guard chamber is ordinarily operated at a temperature in the range 75–200° F., a pressure of 100–600 p.s.i.g., or sufficient pressure to maintain the hydrocarbons in liquid phase, and a liquid hourly space velocity for hydrocarbon feed of 1–30. A presently prefererd molecular sieve for use in the first guard chamber is the 13–X molecular sieve.

In actual operation the second guard chamber, or zinc oxide reactor, is ordinarily operated at a temperature in the range 550–850° F., a pressure in the range of 100–600 p.s.i.g., and a hydrocarbon feed liquid hourly space velocity of 1–10. If desired, steam can be introduced into the hydrocarbon feedstock between the guard chambers or subsequent to the zinc oxide contactor. In the event of addition of steam prior to the zinc oxide contactor, the steam to hydrocarbon weight ratio is ordinarily 0.2 to 1 to 4 to 1.

The zinc oxide contactor ordinarily uses any available zinc oxide, natural or synthetic, having a zinc oxide content greater than about 10 weight percent, and preferably greater than about 50 weight percent. The zinc oxide contact area is ordinarily operated under vapor phase conditions with or without steam as indicated above.

EXAMPLE

The process of the invention was tested using a commercial cobalt molybdate catalyst ($\frac{3}{16}$-inch pellets) containing 3 weight percent cobalt, 15 weight percent molybdenum oxide and the remainder oxygen and gamma-alumina which was alkalized by the addition of 5 weight percent (on the total catalyst) of either potassium carbonate or barium acetate. Both catalysts were reduced and sulfided at 900° F. in a 50/50 (volume) mixture of hydrogen and hydrogen sulfide, and were tested for steam-reforming of propane containing 0.2 weight percent sulfur (as $CS_2$) at a steam to hydrocarbon mol ratio of 3.6 and a pressure of 1000 p.s.i.g.

| Promoter | $K_2CO_3$ | | | $Ba(OAc)_2$ | | |
|---|---|---|---|---|---|---|
| $C_3H_8$ sp. vel., liq. v./v./hr. (gaseous) | 1.1(~280) | | | 1.3(~330) | | |
| Time, hr | 5 | 15 | 22 | 5 | 15 | 22 |
| Hot spot temp., ° F | 1,130 | | 1,254 | 1,058 | | 1,208 |
| Effluent, mol percent: | | | | | | |
| $H_2$ | 20.6 | 11.9 | 3.0 | 24.4 | 16.5 | 22.0 |
| $CO+CO_2$ | 8.3 | 7.2 | 1.5 | 12.6 | 10.7 | 8.7 |

It is apparent that even at a higher space velocity and a lower hot-spot temperature the barium-promoted catalyst is more active and potentially longer-lived for synthesis gas production.

A run was made under the same conditions with the same feed as set forth above, using a cobalt molybdate catalyst that had not been treated with either potassium carbonate or barium acetate. It was found that this catalyst was inactive for the steam reforming of propane.

I claim:
1. A process for the production of (a) carbon monoxide and hydrogen or (b) gases rich in methane fungible with natural gas from hydrocarbon feedstocks which comprises contacting a hydrocarbon feedstock having hydrocarbons containing at least 2 carbon atoms per molecule with steam and a supported chromate, tungstate or molybdate of iron oxide group metals treated with a barium salt of an organic acid.

2. A process according to claim 1 wherein the treated catalyst contains from 1–10 weight percent of the iron group metal and 5–25 weight percent of chromate, tungstate or molybdate calculated as oxide, and the remainder is support material.

3. A process according to claim 1 wherein the catalyst is a cobalt molybdate alumina supported material.

4. A process according to claim 1 wherein the catalyst contains from 1–10 weight percent barium acetate.

5. A process according to claim 1 wherein the reforming temperature is in the range 600–1000° F. and the steam to hydrocarbon weight ratio is in the range from 1.2:1 to 6:1.

6. A process according to claim 1 wherein the reforming temperature is in the range 1000–1600° F. and the steam to hydrocarbon ratio is in the range from 1.2:1 to 6:1.

7. A process according to claim 1 wherein the hydrocarbon feedstock comprises propane.

References Cited
UNITED STATES PATENTS 3,423,194   1/1969   Kearby _____ 48—214

MORRIS O. WOLK, Primary Examiner

R. E. SERWIN, Assistant Examiner

U.S. Cl. X.R.
23—212; 252—430